US005855715A

United States Patent [19]

Langford et al.

[11] Patent Number: 5,855,715

[45] Date of Patent: Jan. 5, 1999

[54] METHOD OF MAKING A PAINT APPLICATOR

[75] Inventors: Nathaniel P. Langford, Somerset, Wis.; Daniel H. Bishop, St. Paul Park, Minn.

[73] Assignee: Minnesota Mining and Manufacturing Company, St. Paul, Minn.

[21] Appl. No.: 911,729

[22] Filed: Jul. 10, 1992

Related U.S. Application Data

[62] Division of Ser. No. 482,258, Feb. 20, 1990, Pat. No. 5,146,646.

[51] Int. Cl.[6] ............................ B32B 31/18; B32B 31/26

[52] U.S. Cl. ......................... 156/187; 156/188; 156/191; 156/250; 156/257; 156/268; 156/279; 15/230.12

[58] Field of Search ................................... 156/195, 251, 156/188, 191, 187, 257, 250, 268, 279; 29/120, 110, 132; 428/36.4, 36.5, 359, 360, 361, 375, 376, 377, 313.3, 301, 317.9, 298, 299; 427/189, 196, 200, 206, 375; 15/210.1, 230.11, 230.12, 230.13, 244.3

[56] References Cited

U.S. PATENT DOCUMENTS

| | | | |
|---|---|---|---|
| 2,378,900 | 6/1945 | Adams | 15/244 |
| 2,411,842 | 12/1946 | Adams | 15/27 |
| 2,584,724 | 2/1952 | Mattie | 15/132.5 |
| 2,708,763 | 5/1955 | Jacoby | 15/132.5 |
| 2,751,618 | 6/1956 | Pruitt | 15/128 |
| 2,887,711 | 5/1959 | Hutchinson | 15/230 |
| 2,972,158 | 2/1961 | Voskresenski | 15/244 |
| 3,005,219 | 10/1961 | Miller | 15/98 |
| 3,030,696 | 4/1962 | Serwer | 29/127 |
| 3,040,353 | 6/1962 | Gray | 15/118 |
| 3,159,905 | 12/1964 | Baggett, Jr. | 29/110 |
| 3,588,264 | 6/1971 | Mallindine | 401/197 |
| 3,635,158 | 1/1972 | Budinger | 101/147 |
| 3,655,477 | 4/1972 | Scholl et al. | 156/251 X |
| 3,671,373 | 6/1972 | Grewe | 427/200 X |
| 3,812,782 | 5/1974 | Funahashi | 101/367 |
| 3,877,123 | 4/1975 | Pharris | 29/116 R |
| 3,906,581 | 9/1975 | Marino et al. | 15/230.11 |
| 4,015,306 | 4/1977 | Fenster | 15/209 |
| 4,155,139 | 5/1979 | Corcoran | 15/244 R |
| 4,237,592 | 12/1980 | Kuge et al. | 29/119 |
| 4,315,342 | 2/1982 | Ash | 15/121 |
| 4,434,521 | 3/1984 | Martin et al. | 15/230 |
| 4,466,151 | 8/1984 | Barch et al. | 15/209 D |
| 4,510,641 | 4/1985 | Morris | 15/118 |
| 4,692,975 | 9/1987 | Garcia | 29/120 |
| 4,856,136 | 8/1989 | Janssen | 15/244.3 |

FOREIGN PATENT DOCUMENTS

| | | | |
|---|---|---|---|
| 2.178.810 | 11/1973 | France | B29C 27/00 |
| 1214170 | 12/1970 | United Kingdom | 156/167 |

OTHER PUBLICATIONS

"Die Mappe" Jun. 1988, pp. 23–27 New Developments With Paint Rollers.

*Primary Examiner*—Curtis Mayes
*Attorney, Agent, or Firm*—William L. Huebsch

[57] ABSTRACT

A paint applicator has a paint-impervious backing such as a cylindrical core to which is adhered a resilient reticulated reservoir such as an open-cell polyurethane foam. Covering the reservoir is a flexible reticulated metering layer that is not bonded to the reservoir except at crossing points of the reticulations. The applicator better releases paint and is more easily cleaned as compared to prior paint applicators having pile fabric coverings. In addition to paint rolls, other types of paint applicators such as paint pads and paint mittens can employ the same composite of a reticulated reservoir and reticulated metering layer.

4 Claims, 1 Drawing Sheet

METHOD OF MAKING A PAINT APPLICATOR

This is a division of application Ser. No. 07/482,258 filed Feb. 20, 1990, now U.S. Pat. No. 5,146,646.

BACKGROUND OF THE INVENTION

1. Field of the Invention

The invention concerns paint applicators such as paint rollers and paint pads.

2. Description of the Related Art

For a history of paint rollers, see Wahl: "Neuentwicklungen bei Farbrollern" *Die Mappe* 6/88, pp. 23–27. It says that the first paint rollers had lambskin covers but that today almost equal quality can be attained at lower cost with woven and knitted polyamide or polyester fibers and that the best of these is a woven plush of polyamide spun fibers. For painting large areas with latex paints, the pile heights may be from 12 to 25 mm. The roll body or core of the paint roller is usually a cardboard impregnated by a plastic material, and strips of the pile fabric are diagonally wound onto and firmly adhered to the core. U.S. Pat. No. 4,692,975 (Garcia) shows equipment for helically winding a cover fabric onto a thermoplastic tubular core and fusing the fabric to the core.

The Wahl publication points out that fiber-deep cleaning of paint roller covers is a prerequisite for achieving a sufficiently long useful life and a good coating quality. Wahl says that this can be done manually but that better cleaning is provided by a device which rotates the roll rapidly while a stream of water is directed against the roll, thus centrifuging the paint out of the cover material.

Instead of a fabric cover, some paint rollers employ an elastomeric open-cell foam. One such cover is described in U.S. Pat. No. 2,378,900 (Adams) which calls it "a sleeve of resilient sponge rubber" or "absorbent sponge rubber covering or sleeve" without further description except that it preferably is synthetic rubber for durability and for easier cleaning. A similar "foam rubber or foam plastic" paint roller is described in U.S. Pat. No. 2,972,158 (Voskresenski).

U.S. Pat. No. 2,411,842 (Adams) describes a paint roller cover that is a composite of a pile fabric and an underlying "layer of relatively soft and yielding rubber, preferably a layer of sponge rubber" (col. 2, lines 44–46). The "sponge rubber forms a cushioning medium beneath the fabric layer . . . (that) enables the roller to adapt itself more readily to irregularities in the surface being coated . . . Some of the paint or coating material with which the device is used may pass through the fabric layer 20 and enter the cells of the sponge rubber layer 21 thereby increasing the paint-carrying capacity of the roller" (col. lines 12–32).

A paint roller for use in corners is shown in U.S. Pat. No. 3,159,905 (Baggett, Jr.).

Among other types of paint applicators are brushes that typically have handles with a flexible elastic extension, and an elastomeric open-cell foam forms an envelop around the extension. See, for example, U.S. Pat. No. 4,155,139 (Corcoran). Another type is a mitten which fits a painter's hand and typically is made of a fabric pile, the base of which has been made impervious to paint.

SUMMARY OF THE INVENTION

The invention provides a paint applicator that readily picks up a desirably large volume of paint, meters out the paint evenly, and can be quickly and thoroughly cleaned manually. Briefly, the paint applicator of the invention comprises:

a paint-impervious backing, a resilient reticulated reservoir of substantially uniform thickness carried by the backing, and a flexible exterior reticulated metering layer which is not bonded to the underlying reservoir except at crossing points of the reticulations, which metering layer has at least twice as many openings linearly as does the reservoir and has a substantially uniform thickness less than one-half that of the reservoir.

For use with most paints, the reticulated reservoir should have from 2 to 20 openings/cm, and preferably from 4 to 12 openings/cm for paints having a viscosity of from 3,000 to 20,000 cps. At a substantially smaller number of openings/cm, the reservoir might be too weak. At a substantially greater number of openings/cm, the reservoir might be unduly slow at picking up and releasing paint, and it would be more difficult to clean the paint applicator. For use with stains or paints of very low viscosity, the openings of the reservoir can be smaller than the aforementioned ranges, and for paints of unusually high viscosity, the openings can be larger.

For use with most paints, the reticulated metering layer should have from 15 to 100 openings/cm, and preferably from 20 to 50 openings/cm for paints having a viscosity of from 3,000 to 20,000 cps. At a substantially greater number of openings/cm, the metering layer might unduly restrict the flow of paint unless its viscosity were unusually low. For most uses, the thickness of the reticulated metering layer should be from 0.2 to 4 mm, and preferably from 0.5 to 2 mm. At substantially greater thicknesses, the metering layer might unduly inhibit the paint flow. At substantially smaller thicknesses, it would be difficult to ensure that the metering layer has uniform thickness.

Each of the reservoir and metering layer should have substantially uniform openness, and hence have a uniform number of openings/cm both at the surface and at any plane parallel to the surface. The number of openings/cm can be determined by making a vertical cut and, using a microscope that has a scale, examining an exposed corner at an angle of about 45° to the cut. Because the openings tend to be uneven and it can be difficult to avoid counting underlying openings, the count can be subjective.

Each of the reservoir and the metering layer should have a voids volume of at least 80%, preferably at least 90%, and more preferably at least 95%. At substantially lower voids volumes, the novel paint applicator would be more difficult to clean. Furthermore, the reservoir might not pick up adequate volumes of paint, and the metering layer might unduly restrict the flow of paint unless it were quite thin.

Preferred resilient reticulated reservoirs are provided by open-cell polymeric foams, e.g., a polyurethane foam that is sufficiently open to have a fibrous appearance. A preferred open-cell foam is a polyurethane ester foam which has about 8 openings/cm, a thickness of 9.5 mm, and a voids volume of about 97%, and is available under the designation "Foamex" P-20 from Foamex of Eddystone, Pa. Because it has excellent resiliency, it allows the surface of the novel paint applicators to penetrate into depressions of the surface being painted. A useful reticulated reservoir can also be made from staple fibers.

The preferred thickness of the reticulated reservoir is governed in part by the roughness of surfaces to be painted, but for most uses, its thickness should be from 3 to 25 mm, preferably from 8 to 12 mm. At substantially lesser thicknesses, the novel paint applicator might not hold sufficient paint to cover desirably large areas without replenishing, and if paint is being continuously fed into the novel paint applicator, a reticulated reservoir of substantially lesser thickness might not distribute the paint uniformly over the full working surface of the applicator. On the other hand, if the thickness of a reticulated reservoir of a preferred voids volume were substantially greater than 20 mm, it might hold so much paint as to be overly heavy and hence tiring to the painter.

The flexible reticulated metering layer can be formed on the exterior surface of the reticulated reservoir by simultaneously depositing staple fibers and fusible fibers, which fusible fibers soften when heated to a temperature below the softening point of the staple fibers and tend to flow to the crossing points of the staple fibers and to points of contact between the staple fibers and the reticulated reservoir, thus affording both good integrity to the reticulated metering layer and good adhesion between the metering layer and the reservoir. Some or all of the staple fibers can have coatings of low-melting resin which also help to bond the reservoir and metering layer together at crossing points of their reticulations. Coated polyester staple fibers are available as "Melty-Fiber Type 4080" from Unitika Ltd., Osaka, Japan.

Instead of bonding the metering layer to the reservoir at crossing points of their reticulations, the metering layer can be made to fit tightly around the reservoir. However, when they are bonded together, the metering layer is more resistant to creeping or wrinkling in use.

A preferred reticulated metering layer can be formed on the exterior surface of the reservoir by first forming a nonwoven web of the fusible fibers and then applying that web to the reservoir while the staple fibers are blown or dropped onto the web. When the paint-impervious backing of the novel paint applicator is a cylindrical core, a strip of reticulated reservoir material can be spirally wound onto the core, and a large number of convolutions of the web can be wound over the reservoir while dropping or blowing staple fibers between adjacent convolutions.

The reticulated metering layer can instead be provided by an open-cell polymeric foam such as polyurethane foams that can be bonded to the reticulated reservoir by heating the reticulations at the surfaces of the reservoir and/or metering layers to render them sufficiently tacky to become bonded to each other on contact. In doing so, care should be taken to limit the bonding to points at which the reticulations cross at the field of contact between the reservoir and metering layer. Otherwise, the flow of paint into and out of the reticulated reservoir would be inhibited.

Staple fibers of either the metering layer or the reservoir preferably are from 10 to 100 $\mu$m in diameter, more preferably from 10 to 40 $\mu$m. When the metering layer comprises staple fibers of substantially greater diameters they might allow the paint to flow too freely, while fibers of substantially smaller diameters might unduly inhibit the paint flow.

Any staple fibers employed in the novel paint applicator should have good chemical resistance and high tensile strength, as do poly(ethylene terephthalate) and nylon. Staple fibers of those materials can conveniently be bonded at their crossing points through the use of fusible fibers such as blown microfibers that may or may not have the same chemical composition as the staple fibers. Useful blown microfibers are described in Wente: "Superfine Thermoplastic Fibers", *Ind. Eng. Chem.,* Vol. 48, pp 1342 et/seq. (1956).

Upon being dipped into paint, the novel paint applicator immediately picks up a volume of paint that nearly fills its voids, and it can release about 70% of that paint, compared to a release of about 50% by fabric paint applicators presently on the market. That improved release allows larger areas to be painted before replenishing and also affords easier cleaning. Preferred paint applicators of the invention can be thoroughly cleaned manually within about one minute. In contrast, manual cleaning of a paint applicator with a pile fabric requires about five minutes, and even then, some paint remains at the base of the pile and in the fabric into which the fibers are woven.

In what may be its most useful form, the backing of the novel paint applicator is a cylindrical paint-impervious core, and the reticulated reservoir and metering layer form a sleeve around the core to provide a paint roll. That core is no different from cylindrical cores of prior paint rolls, e.g., a hollow cylinder of plastic or cardboard that can be impregnated with a resin.

A paint applicator of the invention that can be mounted on a paint roller can be made by the sequential steps of:

a) continuously forming a cylindrical paint-impervious core, b) spirally winding onto, and bonding to, the core an elongated strip of a resilient, reticulated reservoir, c) forming on the exterior surface of the reservoir a flexible reticulated metering layer which has at least twice as many openings/cm as does the reservoir and a thickness less than one-half that of the reservoir, d) bonding the metering layer to the underlying reservoir only at crossing pints of the reticulations, and e) cutting the resulting composite to individual roll lengths.

As noted above, the bonding in step d) preferably is achieved by heating fibers at the surfaces of the reservoir and/or metering layers to render them sufficiently tacky to become bonded to each other at the crossing points of their reticulations.

Between steps b) and c), the axial edges of the reticulated reservoir can be notched at the ends of the individual roll lengths so that the metering layer wraps around the axial ends of the reservoir, thus metering the flow of paint out of those ends. For an attractive appearance, the axial ends of the reservoir are uniformly tapered, and the length of the reservoir is greater at the face of the core than it is at the metering layer.

Other types of paint applicators can be constructed in comparable fashion and include diverse roll shapes such as one having a core that forms a pair of identical cones having a common base, useful for painting inside corners. The backing of another paint applicator includes a broad, thin substrate, and a handle is secured to the substrate. The reticulated reservoir forms an envelop around the substrate, while the metering layer forms the exterior of the resulting paint brush.

The backing of another paint applicator is a paint-impervious mitten with the reticulated reservoir forming an envelop around the mitten. Still another type is a paint pad with a handle secured to a broad, thin paint-impervious backing or substrate. The reticulated reservoir is secured to one face of the substrate with the reticulated metering layer at the exterior. The face of the substrate can be flat for painting flat surfaces or it can form an angle such as 90° for painting inside corners, or it can be cylindrical, conical, or any of a variety of other shapes.

While being primarily useful for applying paint, the paint applicator of the invention can be used to apply coatings of other liquids such as pastes and other adhesives, sealers, waxes, and preservatives.

While two layers of reticulated materials are sufficient for purposes of the invention, the paint applicator of the invention can have three or more reticulated layers with progressively smaller openings toward the exterior. Instead, it may be feasible to incorporate both the reservoir and metering layer into a single layer of progressively smaller openings from interior to exterior. Other such variations in the construction of the novel paint applicator are likely to occur to those skilled in the art without departing from the spirit of the invention.

THE DRAWINGS

The invention may be more easily understood in reference to the figures, all figures of which are schematic. In the figures.

DETAILED DISCLOSURE OF THE INVENTION

Figure 1:
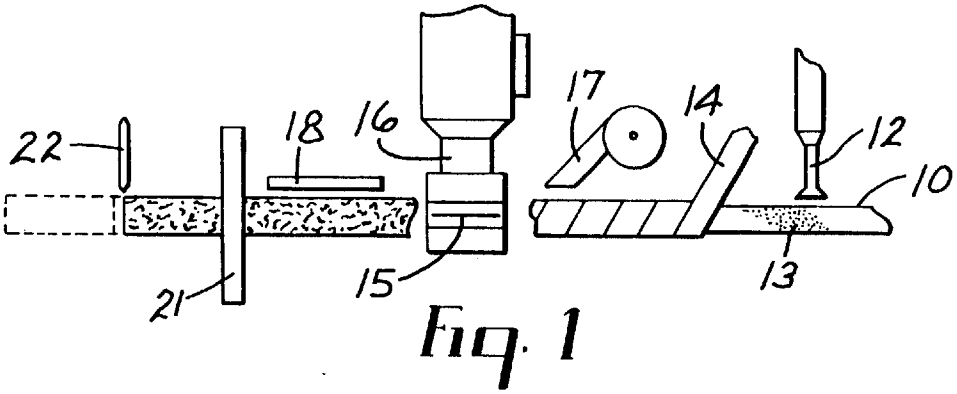
FIG. 1 is a plan view of apparatus for making a preferred paint applicator of the invention in the form of a roll.

In FIG. 1, a hollow paint-impervious core 10 (which is being formed continuously by apparatus not shown) is continuously advanced past a hot-melt adhesive coater 12 which deposits a layer of adhesive 13. After spirally winding a strip of resilient, reticulated material 14 over the adhesive, the resulting reservoir is covered by unwinding a web 15 of microfibers and simultaneously dropping staple fibers from a hopper 16 into a flow of hot air from a blower 17. The microfibers are then softened and fused by an infrared heater 18, thus causing the material of the microfibers to flow to crossing points of the staple fibers and to points at which the staple fibers contact the underlying reticulations of the reservoir 24, thus both forming a flexible reticulated metering layer 20 and bonding that layer to the reservoir. The resulting composite then passes a sealing mechanism 21 that fuses the metering layer to the adhesive 13 on the core at points 19 (FIG. 2) at which the composite is severed by a cutter 22 into individual paint rolls 23.

Figure 2:
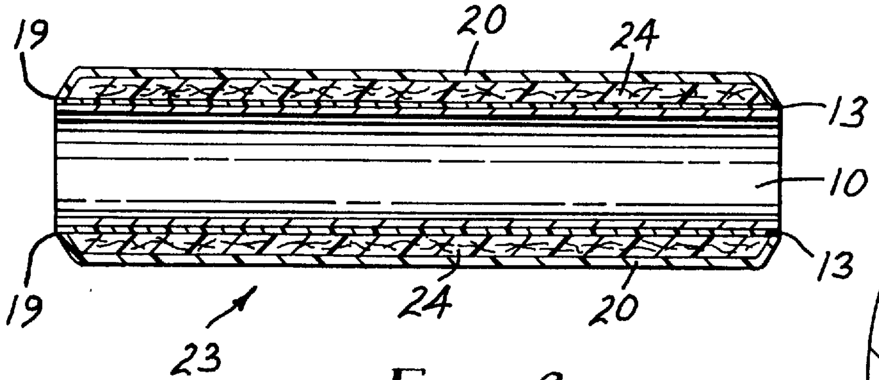
FIG. 2 is a longitudinal section through a paint roll made as shown in FIG. 1.

In the paint roll 23 of FIG. 2 produced by the method illustrated in FIG. 1, the metering layer 20 has no seam, thus avoiding a problem in prior paint rolls made with strips of pile fabric which sometimes fail due to separation between adjacent convolutions of the pile fabric. By forcing and fusing the ends of the metering layer 20 against the adhesive at points 19, the axial ends of the reservoir 24 are covered by the metering layer.

Figure 3:
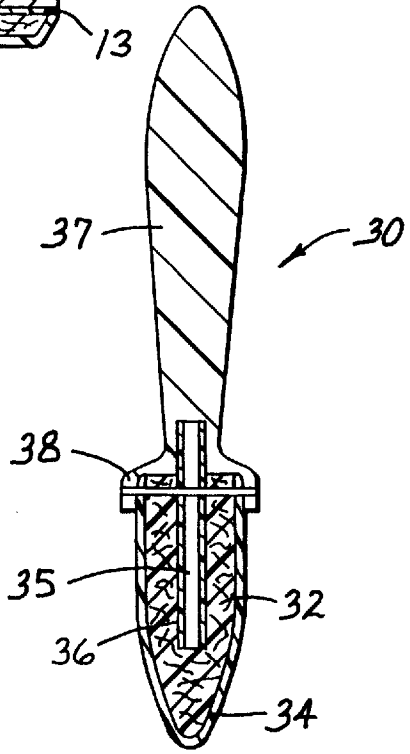
FIG. 3 is a central section through a paint brush of the invention.

To make the paint brush 30 shown in FIG. 3, a strip of resilient, reticulated reservoir material 32 is covered by a reticulated metering layer 34, and the two are formed into a sleeve that encompasses and is bonded to a broad, thin backing or substrate 35 by an adhesive layer 36. Secured to the substrate is a handle 37 and a ferrule 38.

Figure 4:
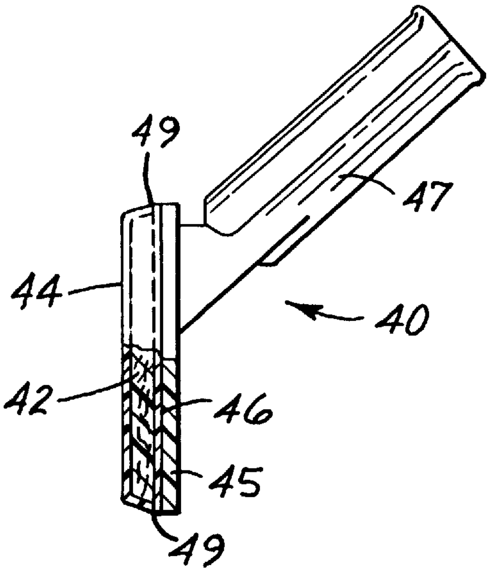
FIG. 4 is a side view of a paint pad of the invention, partly broken away to a section.

To make the paint pad 40 shown in FIG. 4, a strip of resilient, reticulated reservoir material 42 is covered by a reticulated metering layer 44. A piece of the resulting composite is bonded to a broad, thin paint-impervious backing or substrate 45 by an adhesive layer 46. The ends of the metering layer 44 are fused to the adhesive layer 46 at 49 to cover the edges of the reservoir 42. A handle 47 projects from the back side of the substrate 45.

Liquid Flow Test

To evaluate reticulated materials for use in paint applicators of the invention, their liquid flow properties can be tested using a 2-liter, bottomless polyethylene bottle 10.8 cm in diameter with a neck 3.8 cm in length and 2.5 cm in diameter. A hole 1.3 cm in diameter is drilled at the center of a cap. Reticulated material to be tested is cut to fit between the cap and the neck.

The liquid used in the test is a mixture of water and 0.5% by weight of hydroxypropylmethylcellulose ("Methocel" J20MS from Dow Chemical). After mixing for one hour and standing overnight, its viscosity is about 75 cps (Brookfield, LV spindle #1 at 30 rpm).

With the cap screwed tightly against the test sample and the cap facing downwardly, 630 g of the liquid fills the bottle to a height of about 9.5 cm, and the time at which the liquid height drops to 5.1 cm is measured, i.e., 500 g flows through the sample. Thicker samples of the same material have a longer "Flow Time" so that both the Flow Time and desired thickness should be taken into account in selecting materials for each of the reservoir and the metering layer.

When the reservoir of a novel paint applicator has a preferred thickness of about 9.5 mm, it preferably has a Flow Time of less than 50 seconds. At a substantially higher Flow Time, it would not provide desirably high paint release, and it might not be possible to clean the applicator completely within a short time. When the metering layer of a novel paint applicator has a preferred thickness of about 1.0 mm, it preferably has a Flow Time within the range of 15 to 50 seconds. At a substantially longer flow time, it would tend to unduly restrict paint flow, and at a substantially shorter flow time, it would tend to allow paint to flow out too freely.

Reticulated Materials

Reticulated materials that have been tested for Flow Times as reported below in Table I and also used as the reservoir and metering layer of novel paint applicators include the following reticulated foams:

| Notation | Trade Name | Source | Material |
|---|---|---|---|
| F P-20 | "Foamex" P-20 | Foamex | polyurethane ester |
| F P-45 | "Foamex" P-45 | Foamex | polyurethane ester |
| F P-60 | "Foamex" P-60 | Foamex | polyurethane ester |
| F P-80 | "Foamex" P-80 | Foamex | polyurethane ester |
| F P-100 | "Foamex" P-100 | Foamex | polyurethane ester |
| G P-15 | "General" P-15 | General Foam | polyurethane ether |
| G P-30 | "General" P-30 | General Foam | polyurethane ether |

In each of the trade names, P- indicates the number of openings/inch. Hence, P-20 indicates 20 openings/inch or 51 openings/cm.

Also reported in Table I are Flow Times of the following reticulated nonwoven webs. The polyurethane used in each web was PS 455-200 from Morton Thiokol, Inc. The uncoated polyester staple fibers were:

| Notation | Description |
|---|---|
| 73:27 | mixture of 73 parts 8-μm polyurethane microfibers and 27 parts of 3.8-cm polyester staple fibers:<br>45% 11 μm (T 121 from Hoechst Celanese Corp.)<br>45% 25 μm (T 294 from Hoechst Celanese Corp.)<br>10% 40 μm (including a low-melting coating) |
| 73:27A | mixture of 73 parts 8-μm polyurethane microfibers and 27 parts of 3.8-cm polyester staple fibers:<br>40% 11 μm,<br>40% 25 μm,<br>20% 40 μm (including a low-melting coating) |
| 73:27B | mixture of 73 parts 8-μm polyurethane microfibers and 27 parts of 3.8-cm polyester staple fibers:<br>60% 22 μm,<br>20% 18 μm,<br>20% 12 μm (including a low-melting coating) |
| 62:38 | mixture like 73:27 except at a 62:38 ratio of the polyurethane microfibers and the following polyester staple fibers:<br>70% 11 μm,<br>30% 18 μm, |

-continued

| Notation | Description |
|---|---|
| 74:26 | mixture like 73:27 except at a 74:26 ratio of the polyurethane microfibers and the following 3.8 cm polyester staple fibers: 25% 11 μm, 45% 25 μm, 30% 40 μm (including a low-melting coating) |
| 68:32 | mixture like 73:27 except at a 68:32 ratio of the polyurethane microfibers and the following 3.8 cm polyester staple fibers: 25% 11 μm, 45% 25 μm, 30% 86 μm (including a low-melting coating) |
| 70:30 | mixture like 73:27 except at a 70:30 ratio of the polyurethane microfibers and the following 3.8 cm polyester staple fibers: 25% 11 μm, 45% 25 μm, 30% 65 μm (including a low-melting coating) |

TABLE I

| Reticulated material | Thickness (mm) | Flow Time (sec) |
|---|---|---|
| F P-20 | 9.5 | 16.5 |
| F P-20 | 1.6 | 7.5 |
| F P-45 | 9.5 | 70. |
| F P-45 | 1.6 | 10.5 |
| F P-60 | 9.5 | 186. |
| F P-60 | 1.6 | 30. |
| F P-80 | 9.5 | 185. |
| F P-80 | 1.6 | 35. |
| F P-100 | 9.5 | 489. |
| F P-100 | 1.6 | 149. |
| G P-15 | 7.8 | 20. |
| G P-15 | 3.2 | 12.5 |
| G P-30 | 9.8 | 41. |
| G P-30 | 2.8 | 15.5 |
| 73:27 | 0.8 | 28. |
| 73:27A | 1.0 | 36. |
| 73:27B | 0.5 | 32. |
| 62:38 | 1.1 | 55. |
| 74:26 | 0.9 | 17. |
| 68:32 | 0.6 | 21. |
| 70:30 | 0.6 | 23. |

EXAMPLE 1

A paint roll as shown in FIG. 2, 23 cm in length, has been constructed as follows:

| | |
|---|---|
| hollow core 10 | cardboard impregnated with phenolic resin |
| outside diameter | 4.0 cm |
| reservoir 16 | F P-20 ("Foamex" P-20) |
| thickness | 9.5 mm |
| openings/cm | about 8 |
| voids volume | about 97% |
| metering layer 20 | |
| thickness | 0.5 mm |
| openings/cm | about 35 |
| voids volume | about 97% |
| fibers | 73:27 mixture described above |

EXAMPLE 2

A paint roll was constructed as in Example 1 except that its metering layer was F P-80 ("Foamex" P-80) having a thickness of 1.6 mm. The materials of the reticulated reservoir and the reticulated metering layer were bonded together by heating their surfaces to make them tacky and immediately placing them together. A 3-inch (7.6-cm) strip of the resulting composite was spirally wound onto a cylindrical cardboard core like that of Example 1 which had been coated with a hot-melt adhesive that was still tacky. The edges of the metering layer were then heat-sealed to the hot-melt adhesive on the core so that the metering layer covered the axial ends of the reservoir.

Testing of Painting Characteristics

Each of the paint rolls of Examples 1 and 2 was used to apply interior flat latex wall paint onto sheetrock. Each roll was submerged in the paint and (without being replenished) used to cover as much sheetrock as possible until coverage was no longer opaque. The roll was weighed both before and after applying the paint, and the area that received an opaque covering was measured. Results are reported in Table I in comparison to the following commercially available paint rolls, each of which had a pile fabric 9.5 mm in thickness, except that of the "Lamb Fab" roll was 12.7 mm in thickness.

| Comparative Roll | Pile thickness (mm) | |
|---|---|---|
| A | 9.5 | "General Purpose" from The Newell Group, Milwaukee, WI |
| B | 12.7 | "Lamb Fab" from The Newell Group |
| C | 9.5 | "Pronel" from The Newell Group |
| D | 9.5 | "One Coater" from The Newell Group |
| E | 9.5 | "Tru-Test" from True Value Hardware Stores, Chicago, IL |

TABLE II

| Roll | Paint pickup (g) | Paint release (g) | Paint release (%) | Coverage ($m^2$) | Wet paint/$m^2$ (g) |
|---|---|---|---|---|---|
| Ex. 1 | 421 | 361 | 86 | 2.0 | 181 |
| Ex. 2 | 451 | 335 | 74 | 2.2 | 152 |
| A | 465 | 251 | 54 | 1.5 | 167 |
| B | 534 | 176 | 33 | 1.1 | 160 |
| C | 436 | 148 | 34 | 0.8 | 97 |
| D | 477 | 164 | 34 | 1.3 | 126 |
| E | 501 | 239 | 48 | 1.7 | 141 |

Data reported in Table II shows that as compared to commercially available paint rolls that have a pile fabric, paint rolls of the invention, as typified by Examples 1 and 2, better release paint and cover a larger area before replenishing.

Testing of Cleaning Characteristics

At the conclusion of the testing reported in Table II, each of the paint rolls was manually cleaned under running water from a faucet. Within one minute, each of the paint rolls of Examples 1 and 2 was believed to be clean. After shaking out water, each was stood on end until dry. Visual examination after drying showed each roll to be virtually free from paint.

Each of the comparative paint rolls was subjected to the same cleaning for five minutes. After being allowed to dry, each had a crusty feeling at the lower end of the roll characteristic of paint retention, whereas each of the paint roll of Example 1 and 2 (that had been cleaned for less than one minute) was devoid of any such feeling, instead having the feel of a new roll. Furthermore, paint was visible at the base of the pile of each comparative roll, whereas there was only a vestige of paint color at the cores of the paint rolls of Examples 1 and 2, much less than was retained on each of the comparative rolls.

What is claimed is:

1. Method of making a paint applicator that can be mounted on a paint roller, said method comprising the sequential steps of:

a) continuously forming a cylindrical core of paint-impervious material, b) spirally winding onto, and bonding to, the core an elongated strip of a resilient, reticulated reservoir, c) forming on the exterior surface of the reservoir a flexible reticulated metering layer which has at least twice as many openings/cm as does the reservoir and a thickness less than one-half that of the reservoir, d) bonding the metering layer to the underlying reservoir only at crossing points of the reticulations, and e) cutting the resulting composite to individual roller lengths.

2. Method as defined in claim 1 wherein the bonding in step d) involves heating fibers at contacting surfaces of the reservoir and metering layers to render them sufficiently tacky to become bonded to each other on contact.

3. Method as defined in claim 1 and further comprising the additional step of fusing the ends of the metering layer to the core at the ends of each roller length to cover the axial edges of the reservoir.

4. Method of making paint applicators that can be mounted on paint rollers, said method comprising the steps of:

a) continuously forming from paint-impervious material a cylindrical core having an axis and a cylindrical peripheral surface, b) spirally winding onto, and bonding to, the peripheral surface of the core an elongated strip of a resilient, reticulated reservoir, c) notching the reservoir around the peripheral surface at positions spaced axially of the core to form roller lengths, d) forming on the exterior surface of the notched reservoir a flexible reticulated metering layer which has at least twice as many openings per centimeter as does the reservoir and a thickness less than one-half that of the reservoir, d) bonding the metering layer to the underlying reservoir only at crossing points of the reticulations, e) fusing the metering layer to the peripheral surface of the core in the notches at the ends of the roller lengths to cover the axially spaced edges of the reservoir portion on each roller length, and f) cutting the resulting composite between the roller lengths to form the paint applicators.

* * * * *